(No Model.)
A. WEBER.
UNION JOINT.
No. 494,801.  Patented Apr. 4, 1893.
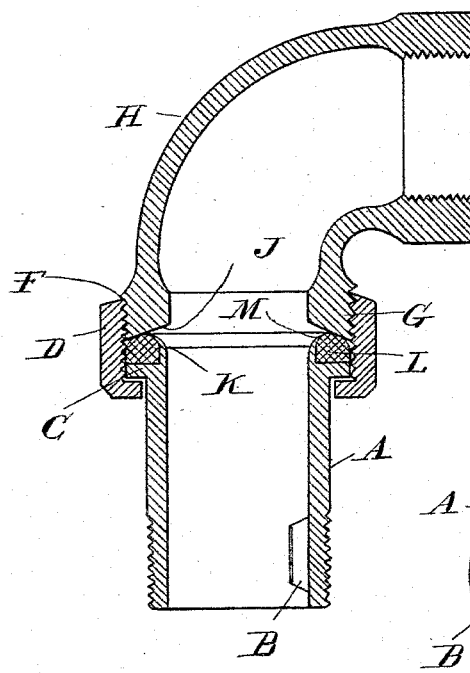
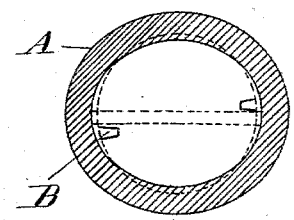
Witnesses
Otto Barthel
A. L. Hobbie
Inventor
Adolph Weber
By Thos. S. Sproquet
Attys.

UNITED STATES PATENT OFFICE.

ADOLPH WEBER, OF DETROIT, MICHIGAN, ASSIGNOR OF TWO-THIRDS TO THOMAS S. CHRISTIE AND BENJAMIN NOBLE, OF SAME PLACE.

UNION-JOINT.

SPECIFICATION forming part of Letters Patent No. 494,801, dated April 4, 1893.

Application filed July 20, 1892. Serial No. 440,662. (No model.)

*To all whom it may concern:*

Be it known that I, ADOLPH WEBER, a citizen of the United States, residing at Detroit, in the county of Wayne and State of Michigan, have invented certain new and useful Improvements in Union-Joints, of which the following is a specification, reference being had therein to the accompanying drawings.

This invention relates to new and useful improvements in unions, and the invention consists in the peculiar construction, arrangement and combination of the various parts, all as more fully hereinafter described.

In the drawings, Figure 1 is a central section through a union embodying my invention. Fig. 2 is a diagram end elevation of one of the nipples.

I have shown in the drawings a union of a nipple and an elbow, but it is evident that it is immaterial what kind of pipes or fittings are connected together by my joint.

A is a nipple, such as is ordinarily secured into the base of a radiator. In securing this nipple in position it is the common practice of pipe fitters to drive a tool into a nipple which will bear in turning against the lugs B and then turn the tool to fasten the nipple securely in position. The ends of the pipe tongs, &c., are frequently used for this purpose, such tools tapering from the point outward and in driving them in this way the mouth of the nipple is frequently spread and forced out of its true circular shape, as shown in Fig. 2. In ordinary unions with brass joints, when the head or mouth is thus bent into irregular shape the pipe fitter in making the connections of the elbow or connecting pipe finds it practically impossible to make a tight joint. My construction is adapted, even under such circumstances as these to make a perfect joint. The nipple is provided with the usual exterior flange C.

D is a coupling ring having an inwardly extending flange at one end, and the interior screw thread F at the other adapted to engage with the exterior screw thread G upon the elbow or nipple H. This elbow or nipple H is provided at its end with the inclined bearing or shoulder J. In the head of the nipple A is formed an annular gain or recess in such manner as to leave a thin inner wall or ring K on the inner face of the nipple. In this gain or notch is placed a ring L, preferably of vulcanized fiber or similar material, having a certain amount of elasticity and yet hard enough to make a good joint and not be crushed out of shape by the action of the coupling ring D. This ring L is held in position by peening over the edge M of the ring K, as plainly shown in Fig. 1. The ring L preferably extends to the outer edge of the flange C. The parts being thus constructed, the coupling D being engaged upon the nipple in the usual manner, and the nipple being screwed into position, the elbow or nipple H being brought into proper position to engage the coupling D with the screw thread F, the operator in turning up the coupling D will cause the inclined bearing J to tightly press against the ring L, which will be slightly flattened by the pressure and form a wide and perfect joint.

In case the nipple has been misshapen in the manner described, or from any other cause, I have found that with my improved construction, when the parts are brought together and the coupling D is turned up firmly the action of the inclined bearing J upon the ring L will give sufficient lateral pressure upon that ring to cause it to force in the ring K to a substantially true circle, effecting a perfect joint between the two parts.

What I claim as my invention is—

1. In a pipe coupling, the combination with a nipple having an exterior flange and an inner extension projecting from its end beyond the flanges, a companion nipple having an inwardly and upwardly inclined edge formed with a threaded outer face, a coupling ring, and a yielding packing in the space between the extension, flange, ring and inclined edge, substantially as described.

2. In a pipe coupling, the combination with a nipple having an exterior flange at its end and an inner extension projecting from its end, beyond the flange, having its outer edge bent outwardly, a companion nipple having an inclined edge, a coupling ring for uniting the parts and a yielding packing in the space between the extension, flange, ring and inclined edge, substantially as described.

In testimony whereof I affix my signature in presence of two witnesses.

ADOLPH WEBER.

Witnesses:
M. B. O'DOGHERTY,
N. L. LINDOP.